No. 695,714. Patented Mar. 18, 1902.
P. C. FORRESTER.
GATE.
(Application filed Nov. 7, 1901.)
(No Model.)
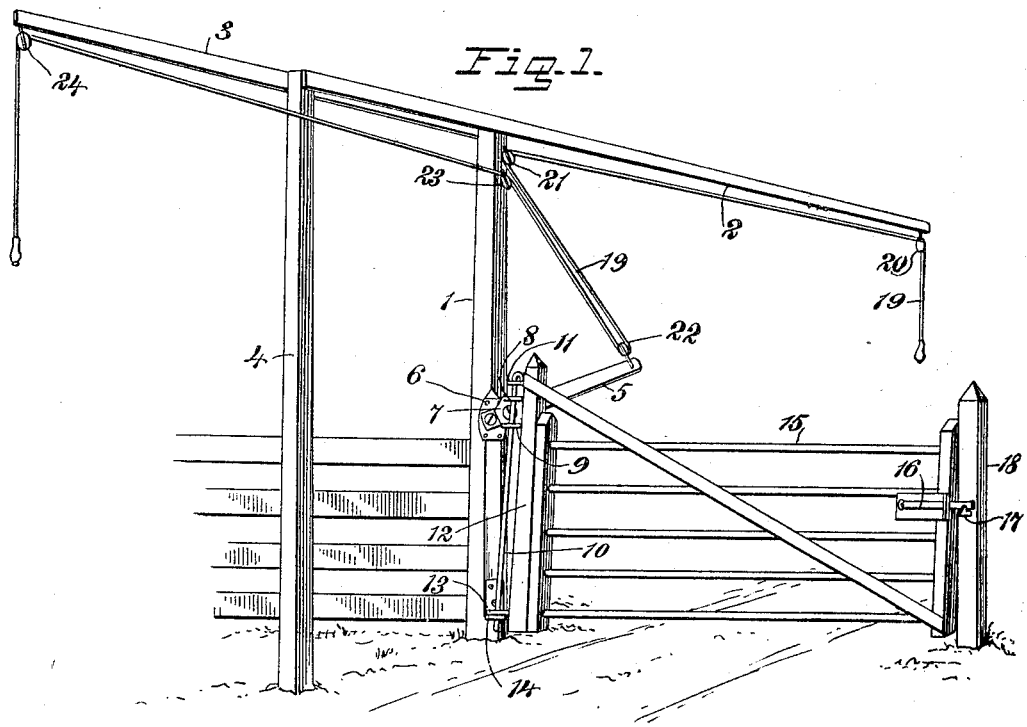
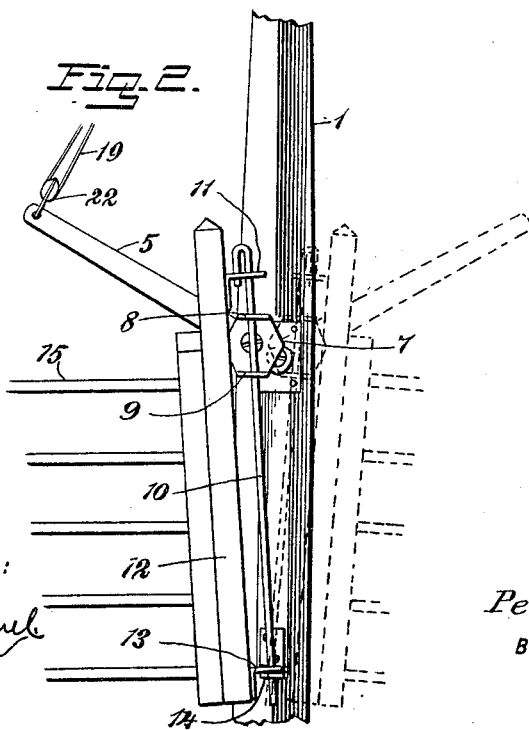
WITNESSES:
INVENTOR
Peter C. Forrester
BY
ATTORNEYS

UNITED STATES PATENT OFFICE.

PETER CORNELIUS FORRESTER, OF STREATOR, ILLINOIS.

GATE.

SPECIFICATION forming part of Letters Patent No. 695,714, dated March 18, 1902.

Application filed November 7, 1901. Serial No. 81,380. (No model.)

*To all whom it may concern:*

Be it known that I, PETER CORNELIUS FORRESTER, a citizen of the United States, and a resident of Streator, in the county of Lasalle and State of Illinois, have invented a new and Improved Gate, of which the following is a full, clear, and exact description.

This invention relates to improvements in swinging gates for driveways; and the object is to provide a simple and inexpensive mechanism that may be operated from either side to cause the gate to open or close.

I will describe a gate embodying my invention and then point out the novel features in the appended claims.

Reference is to be had to the accompanying drawings, forming a part of this specification, in which similar characters of reference indicate corresponding parts in both the views.

Figure 1 is a perspective view of a gate and operating mechanism embodying my invention, and Fig. 2 is a detail showing in full lines the position of parts when the gate is open and in dotted lines the position of parts when the gate is closed.

Referring to the drawings, 1 designates a post arranged at the gate-opening of the fence and extended a considerable distance above the fence. It may be here stated that while I have shown the post 1 as seated in the ground it may, if desired, be bolted or otherwise secured to the ordinary end post of the fence. Extended in opposite directions from the upper end of the post 1 are the bars 2 3. These bars may be supported either at one side or at both sides by posts or standards 4.

Mounted to swing on the post 1 is a weight-actuated lever 5. This lever is pivotally connected to a plate 6, attached to said post 1 and preferably on one corner thereof, so that the lever may swing diagonally of the post. Arranged between the pivotal point of the lever and its free end is a crank-plate 7, having a forwardly-extended upper portion 8 and a forwardly-extended lower portion 9, these portions 8 and 9 being provided with perforations to receive the gate pintle-rod 10, the upper end of which passes through an opening in a plate 11, attached to the hinged stile 12, and to prevent a downward movement of the pintle-rod its said upper end is turned downward to engage in another perforation in said plate 11, as clearly shown in Fig. 2. The lower end of the pintle-rod 10 passes through a plate 13, attached to the stile 12, and also through a plate 14, attached to the post 1. The openings in these plates 13 and 14 are substantially in vertical line with the pivotal point of the actuating-lever 5; but it will be noted that when said actuating-lever 5 is in its substantially horizontal position the openings through the projections 8 and 9 will be at one side of a vertical line drawn from said lower plates 13 and 14.

The gate 15 is provided with a latch 16 for engaging with a keeper 17 on the fence-post 18.

A draw line or cord 19 passes over a pulley 20 at the end of the bar 2, thence around a pulley 21 on the post 1, around a pulley 22 on the end of the lever 5, and then over a pulley 23, attached to the post 1, to a pulley 24 on the end of the bar 3. The depending ends will be provided with suitable handles, and the ends of the draw-line will be provided with knots or other stop devices to prevent their movement through the pulleys 20 or 24 from the outer side thereof.

In operation when the gate is closed the lever 5 will stand in a substantially horizontal plane projecting from one side of the gate, as clearly shown in Fig. 1. When a person seated in a vehicle desires to open the gate, he will draw downward on the draw-line 19, which of course will swing the lever 5 upward to a vertical position, and then by a sharp pull the lever will be drawn to the opposite side of the post 1, as indicated by dotted lines in Fig. 2. This will change the relation of the crank-plate 7 to the plates 13 and 14—in other words, will throw said crank-plate to the opposite side of the vertical line drawn from said lower plates—and when the center of gravity of the gate is thus changed it will swing to open position. Of course during the movement of the lever 5 the gate will be raised to release the latch 16 from the keeper 17. After passing through the gateway the driver by drawing down on the opposite end of the cord will shift the lever to its original position, consequently causing the gate to close. By turning the post 1 or shifting the lever and the plate 14 to the opposite side or corner of the post the gate may be caused to swing in the opposite direction.

Having thus described my invention, I claim as new and desire to secure by Letters Patent—

1. In a gate, a post, a lever mounted to swing on said post, a crank-plate pivoted to said lever between the pivotal point of the lever and its free end, the said crank-plate being provided with an opening in its forwardly-extended portion, a perforated plate at the lower portion of the post, a perforated plate at the upper end of the gate, a perforated plate at the lower end of the gate, a pintle extended through said plates and projection, and means for operating the lever from opposite sides of the gate, substantially as specified.

2. In a gate, a post arranged at the gate-opening, a lever mounted to swing on said post, a crank-plate pivoted to said lever between its fulcrum-point and free end, the said crank-plate being provided with openings in its forwardly-extended portions, a gate, a perforated plate on said gate above said crank-plate, a perforated plate extended outward from the lower portion of the gate, a perforated plate extended forward from the lower portion of the post, a pintle-rod extended through the perforations of said plates and projections, bars extended in opposite directions from the upper portion of the post, and a draw-line passing over pulleys at the ends of said bars, over pulleys on the post and around a pulley on the end of the lever, substantially as specified.

In testimony whereof I have signed my name to this specification in the presence of two subscribing witnesses.

PETER CORNELIUS FORRESTER.

Witnesses:
WM. REIFERSCHEID,
JOHN J. NORRIS.